United States Patent
Bade

(10) Patent No.: US 6,252,505 B1
(45) Date of Patent: *Jun. 26, 2001

(54) ON-SITE ENVIRONMENT MONITORING SYSTEM

(75) Inventor: Russell Elbert Bade, Wrightwood, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,024

(22) Filed: Apr. 6, 1999

(51) Int. Cl.[7] .................................................. G08B 21/00
(52) U.S. Cl. ..................... 340/540; 340/545.6; 340/584
(58) Field of Search .................................. 340/540, 589, 340/521, 693.1, 545.6, 584, 585, 586, 588; 62/127, 129; 165/11.1

(56) References Cited

U.S. PATENT DOCUMENTS

| | | | |
|---|---|---|---|
| 3,823,391 | 7/1974 | Worsley, Jr. et al. | 340/213 |
| 4,375,637 | 3/1983 | Desjardins | 340/517 |
| 4,558,181 | 12/1985 | Blanchard et al. | 179/5 |
| 4,581,606 | 4/1986 | Mallory | 340/539 |
| 4,668,939 | 5/1987 | Kimura et al. | 340/521 |
| 4,668,940 | 5/1987 | Beard et al. | 340/521 |
| 4,673,920 | 6/1987 | Ferguson et al. | 340/521 |
| 4,798,055 | * 1/1989 | Murray | 62/127 |
| 4,831,361 | 5/1989 | Kimura | 340/506 |
| 4,855,721 | * 8/1989 | Hallett et al. | 340/585 |
| 4,866,594 | 9/1989 | David et al. | 364/138 |
| 4,943,799 | 7/1990 | Papineau | 340/521 |
| 5,061,916 | 10/1991 | French et al. | 340/522 |
| 5,257,007 | 10/1993 | Steil et al. | 340/539 |
| 5,424,720 | * 6/1995 | Kerkpatrick | 340/585 |
| 5,438,607 | 8/1995 | Przygoda, Jr. et al. | 379/38 |
| 5,440,301 | 8/1995 | Evans | 340/870.11 |
| 5,451,930 | * 9/1995 | McDaniel | 340/521 |
| 5,481,245 | * 1/1996 | Moldavsky | 340/540 |
| 5,528,228 | * 6/1996 | Wilk | 340/686 |
| 5,564,285 | * 10/1996 | Jurwicz et al. | 340/585 |
| 5,587,701 | 12/1996 | Hess | 340/541 |
| 5,590,831 | * 1/1997 | Manson et al. | 236/51 |
| 5,604,483 | 2/1997 | Giangardella et al. | 340/565 |
| 5,621,387 | * 4/1997 | Phillips | 340/568 |
| 5,726,912 | 3/1998 | Krall, Jr. et al. | 364/550 |
| 5,745,032 | 4/1998 | Sturm | 340/506 |
| 5,798,694 | * 8/1998 | Reber et al. | 340/540 |

* cited by examiner

Primary Examiner—Daniel J. Wu
Assistant Examiner—Anh La
(74) Attorney, Agent, or Firm—Terry J. Anderson; Karl J. Hoch, Jr.

(57) ABSTRACT

An on-site environment monitoring system including at least one on-site environment condition sensor, an on-site alarm signal, and an on-site alert system. The monitoring system includes an on-site alert system having an on-site programmable microprocessor for activating the on-site alarm signal and in communication with the at least one environment condition sensor. The microprocessor is programmable to thereby provide pre-set respective ranges of environment condition values such that activation of the on-site alarm signal occurs when at least one on-site sensed environment condition value is below or above the programmed pre-set range of values. The present system achieves local control of environmental factors by providing on-site monitoring coupled with on-site alerting to thereby facilitate correction of unwanted ambient conditions by on-site personnel without requiring network-monitoring interaction and consequent time consumption.

16 Claims, 2 Drawing Sheets

ON-SITE ENVIRONMENT MONITORING SYSTEM

Figure 1:
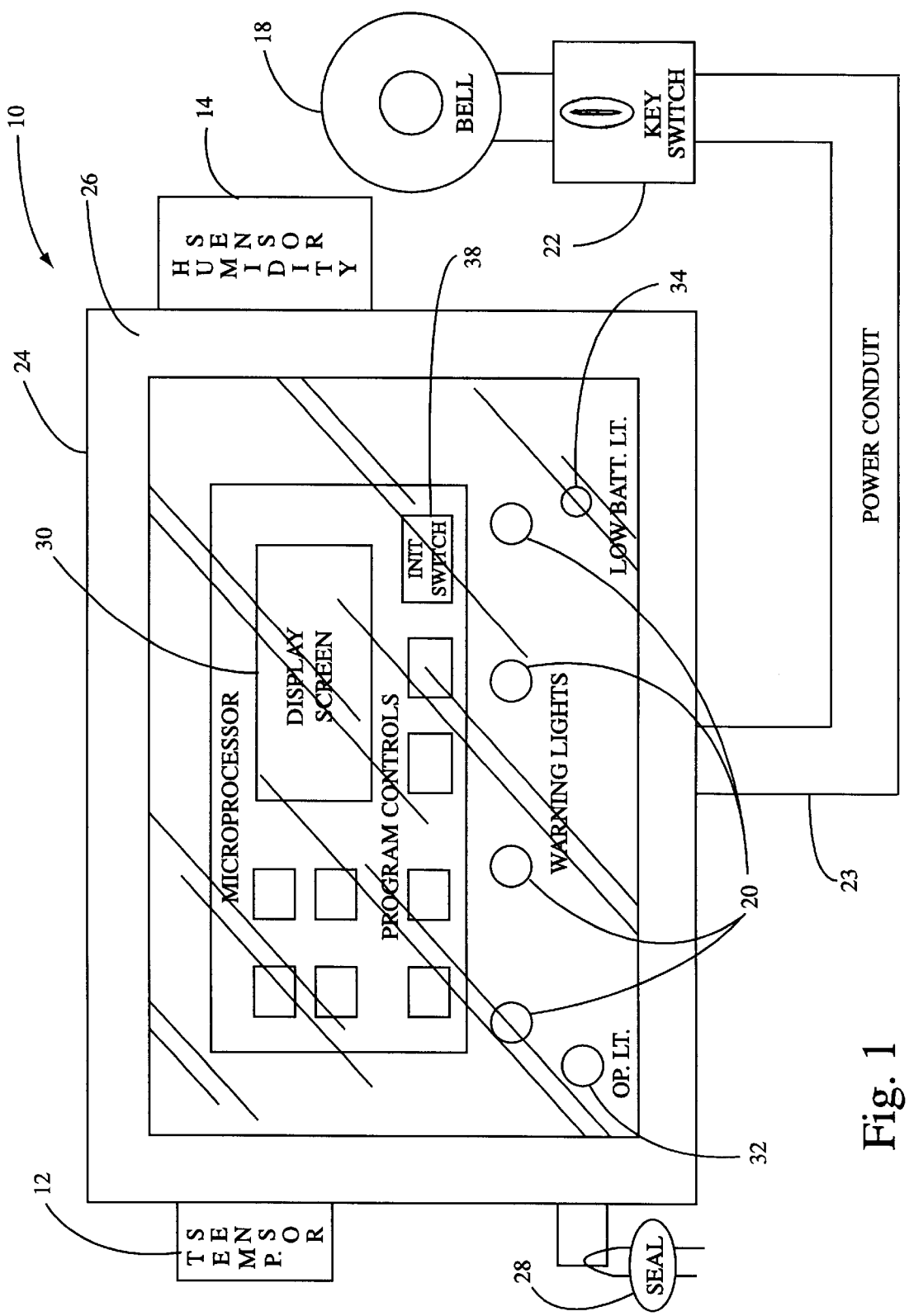

This invention was made with Government support under contract F33657-87-C-2000 awarded by the United States Air Force. The Government has certain rights in this invention.

FIELD OF THE INVENTION

The present invention relates in general to the monitoring of environmental conditions, and in particular to an on-site environment monitoring system wherein an on-site microprocessor in communication with at least one environment condition sensor such as a temperature or humidity sensor activates at least one on-site alarm when at least one on-site sensed environment condition value is below or above a pre-set range of values programmed within the microprocessor.

BACKGROUND OF THE INVENTION

Proper and on-going operation of many types of equipment and many types of processes require that such equipment and/or processes be operated in an environment whose parameters are maintained within certain values. Chief among such environmental conditions are those relating to humidity and to temperature, and can non-limitedly include operability dependable upon proper mechanical interactions, to chemical reactions such as those encountered in curing procedures, and to protective maintenance of crop and food items during shipping or storage.

Because of this importance of certain environmental conditions as correlated to certain requirements dependent upon articles affected, it is likewise important that such environmental conditions can be monitored so that any untoward change of required conditions can be rectified as soon as possible. Prior art devices employed for environment monitoring generally comprise networked systems that are spread throughout a building or complex and that feed ambient information to a central monitoring station where a designated person notes monitored information and thereafter contacts and dispatches appropriate personnel to a problem site. Thus, such networked systems generally do not address immediate notification of on-site personnel via an on-site alarm signal for immediate cognizance and correction of the environmental flaw. Other prior art devices that provide on-site alarm capabilities generally sense only conditions where an excess of a condition (e.g. high temperature, high humidity, etc.) exists, but provide no on-site alarm capabilities where sub-minimum conditions (e.g. unfavorably low temperature, humidity, etc.) are present, even though sub-minimal conditions may be as dangerous as beyond-maximum conditions.

In view of the above considerations wherein on-site alarms are not provided or are only triggered at one end of a spectrum of environmental dangers, it is apparent that a need is present for an on-site environment monitoring system where one or more on-site environment-condition sensors can provide environmental information immediately transferrable to on-site alarm signals if appropriate. Accordingly, a primary object of the present invention is to provide an on-site environment monitoring system with an on-site microprocessor programmable to reflect both upper and lower limits of acceptable selected environmental conditions and cause an on-site alarm signal where a condition exists that falls above a pre-programmed upper limit or below a pre-programmed lower limit.

Another object of the present invention is to provide an on-site environment monitoring system wherein the microprocessor correlatively stores alarm activation with occurrence time and sensed value of a condition causing such activation.

Still another object of the present invention is to provide an on-site environment monitoring system wherein system activation and deactivation can be accomplished on-site.

These and other objects of the present invention will become apparent throughout the description thereof which now follows.

SUMMARY OF THE INVENTION

The present invention is an on-site environment monitoring system comprising at least one on-site environment condition sensor, an on-site alarm signal, and an on-site alert system. The monitoring system comprises an on-site alert system comprising an on-site programmable microprocessor for activating the on-site alarm signal and in communication with the at least one environment condition sensor. The microprocessor is programmable to thereby provide pre-set respective ranges of environment condition values such that activation of the on-site alarm signal occurs when at least one on-site sensed environment condition value is below or above the programmed pre-set range of values. Two environment conditions that commonly affect operability of equipment, storage of products, and the like are temperature and humidity. Thus, as non-limitedly exemplified in the maintenance of food product freshness, a food processing or storage area can have mounted therein the present on-site environment monitoring system wherein a pre-set temperature range value of 40°–60° and a pre-set humidity range value of 25%–40% may be programmed into the microprocessor. Should the temperature fall below 40° or exceed 60°, and/or should the humidity rise or fall to be outside the 25%–40% values, such information will be detected by the respective temperature and humidity sensors and conveyed to the microprocessor which thereafter immediately activates the on-site alarm signal to alert on-site personnel who can rectify the problem. In addition to temperature and humidity values, other non-limitedly exemplified environment conditions can include a required presence of a particular concentration of one or more of a number of gases that may be involved in product processing, a required range of an amount of light (e.g. lumens) for proper organism growth, a home or workplace fresh-air make-up range, and the like.

Because of the importance and benefit of having the present entire monitoring system on-site, such on-site operations include a power switch for activating and deactivating the system, a battery back-up power source for the system, and an alarm signal that can provide either or both of a visual (e.g. light) and audible (e.g. bell) stimulus. The microprocessor along with visually observable programmed parameters as desired preferably are within a housing whose closed entry door or the like is secured with an integrity seal to thereby provide tamper evidence should anyone attempt interference with the operation of the monitoring system. The present system achieves local control of environmental factors by providing on-site monitoring coupled with on-site alerting to thereby facilitate correction of unwanted ambient conditions by on-site personnel without requiring network interaction and consequent time consumption.

DETAILED DESCRIPTION OF THE DRAWINGS

Figure 2:
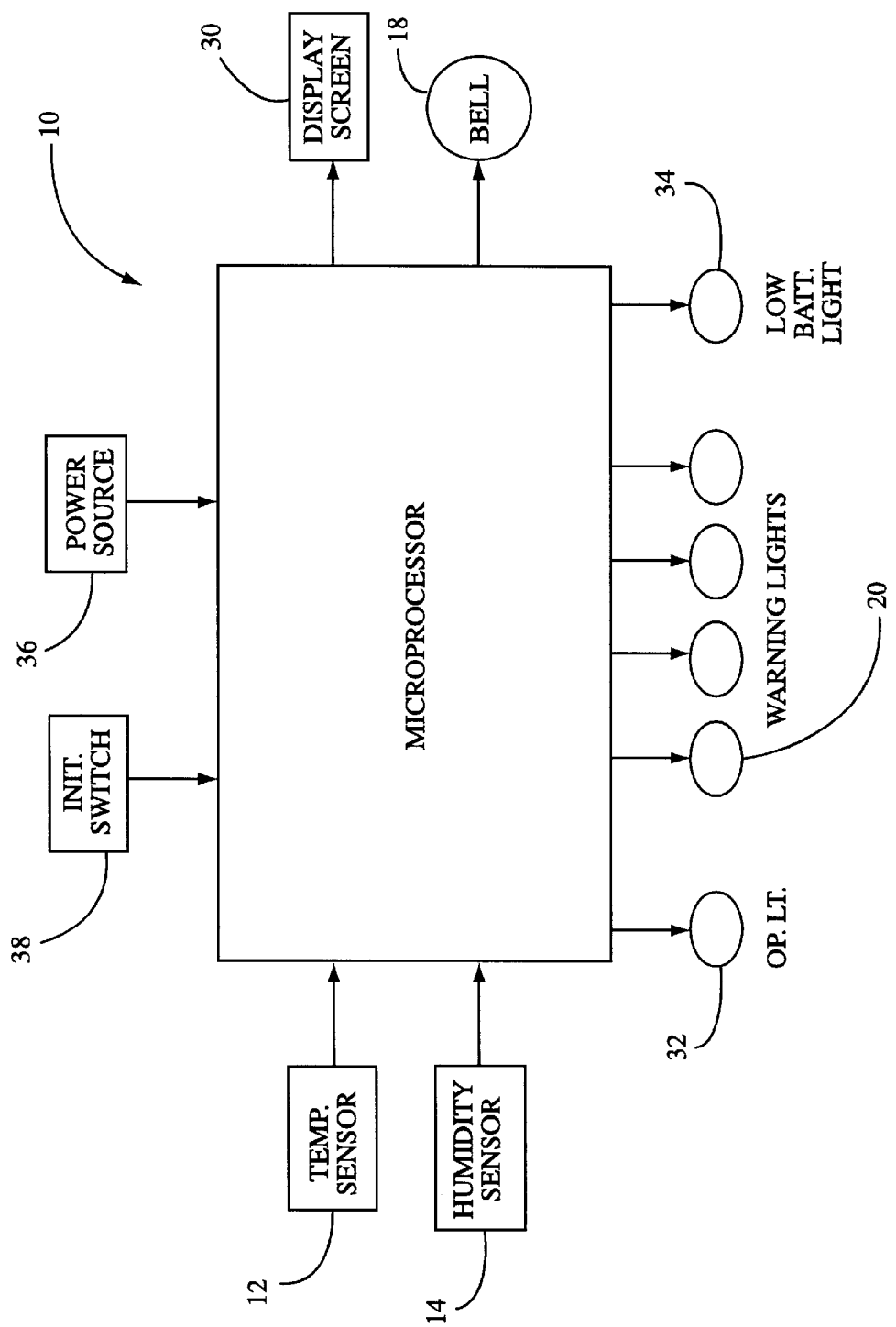

An illustrative and presently preferred embodiment of the invention is shown in the accompanying drawings in which:

FIG. 1 is a schematic front elevation view of an environment monitoring system; and FIG. 2 is a schematic operation diagram of the system of FIG. 1.

DETAILED DESCRIPTION OF THE PREFERRED EMBODIMENT

Referring to FIGS. 1 and 2, an environment monitoring system 10 having a temperature sensor 12 and a humidity sensor 14 is shown. The respective sensors 12, 14 are standard and are in standard communication with a conventional microprocessor 16, preferably disposed within a housing 24, capable of being programmed to react in response to sensed temperature and humidity values. In particular, the microprocessor 16 is programmable to recognize sensed temperature and humidity values as either residing within or outside a programmed range. If one or both such values are outside the programmed range, the microprocessor 16 activates an alarm signal that may include an audible bell 18, one or more, here shown as four, visible warning lights 20 (preferably red), or the like, either operable alone or with each other. In addition to alarm signal lights 20, the system 10 additionally has a operational light 32 that illuminates as directed by the microprocessor when all systems are performing properly and no untoward environment condition exists, and a low-battery warning light 34 that illuminates also as directed by the microprocessor when the battery back-up power source 36 needs charging or replacement.

Because the system 10 is totally on-site, the bell 18 is deactivateable on-site through use of a standard keyed switch 22 positioned within a power conduit line 23 leading to the bell 18. A preferred approach is to provide one key to an on-site worker while storing another key within the housing 24 of FIG. 1. The housing 24 has an openable glass front door 26 that is retained in a closed configuration with an integrity seal 28 that is easily breakable while providing tamper evidence. If the key-carrying worker is not present when an alarm signal is activated, other personnel can break the seal 28 and open the door 26 to retrieve the key and turn off the audible alarm signal bell 18. In addition to activating an alarm signal, the microprocessor 16 also provides a display screen 30, observable through the glass door 26, which shows the violated environment condition so that immediate repair can be initiated by on-site personnel. Upon correction of the undesirable condition, the sensors 12, 14 no longer convey a problem situation to the microprocessor 16, and the lights 20 are extinguished while the operational light 32 (preferably green) once again is illuminated. Meanwhile, the microprocessor 16 correlatively stores alarm activation with occurrence time and sensed value of the environment condition causing said alarm activation.

Initiation of operation of the system 10 occurs when an operator first activates the system 10 through an initiation switch 38 disposed within the housing 24. Thereafter, the operator programs the microprocessor 16, likewise situated within the housing 24, with pre-set range values for both temperature and humidity. Once programming is accomplished, the glass door 26 is closed and an integrity seal 28 is applied to thereby render the system 10 tamper evident. The operational light 32 and low-battery warning light 34 are monitored at least daily to confirm readiness of the system 10, and any change of parameters requiring reprogramming are accomplished by breaking the integrity seal 28 and repeating the steps completed as described above. In this manner, an on-site, local, environment condition monitor permits immediate recognition and rapid repair of untoward environmental events without being restricted by off-site network communications that cannot provide the immediacy experienced through on-site environmental monitoring. Thus, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An on-site environment monitoring system for monitoring at least one condition of an environment, the system comprising:

a) at least one on-site environment condition sensor within said environment for sensing temperature or humidity of said environment;

b) an on-site alarm device within said environment;

c) an on-site alert system mounted within, isolated from, and visible from within said environment and comprising an on-site programmable microprocessor for activating said on-site alarm device and in communication with the at least one environment condition sensor, said microprocessor programmable with pre-set respective ranges of environment condition values such that activation of the on-site alarm device occurs when at least one on-site sensed environment condition value is below or above said pre-set range of values; and d) a dedicated housing within said environment and outside of which is the at least one on-site environment condition sensor and within which the microprocessor is disposed, said housing accessible through an opening having a door securable in a closed configuration with a non-alarm securement device to thereby prohibit unauthorized microprocessor intrusion.

2. An on-site environment monitoring system as claimed in claim 1 wherein the on-site alarm device is a visible stimulus.

3. An on-site environment monitoring system as claimed in claim 1 wherein the on-site alarm device is an audible stimulus.

4. An on-site environment monitoring system as claimed in claim 1 wherein the on-site alarm device is both a visible stimulus and an audible stimulus.

5. An on-site environment monitoring system as claimed in claim 1 additionally comprising a battery back-up power source for the system.

6. An on-site environment monitoring system as claimed in claim 1 wherein the microprocessor correlatively stores alarm activation with occurrence time and sensed value of the environment condition causing said alarm activation.

7. An on-site environment monitoring system as claimed in claim 1 additionally comprising an on-site system initiation switch.

8. An on-site environment monitoring system as claimed in claim 1 wherein said securement device is an integrity seal.

9. An on-site environment monitoring system for monitoring at least one condition of an environment, the system comprising:

a) an on-site temperature sensor within said environment;

b) an on-site humidity sensor within said environment;

c) an on-site alarm device within said environment;

d) an on-site alert system within said environment comprising an on-site alert system mounted within, isolated from, and visible from within said environment and comprising an on-site programmable microprocessor for activating said on-site alarm device and in communication with the temperature sensor and the humidity sensor, said microprocessor programmable with pre-set respective ranges of temperature and humidity values such that activation of the on-site alarm device occurs when an on-site sensed temperature value or an on-site sensed humidity value is below or above said pre-set range of values; and e) a dedicated housing within said environment and outside of which is the at least one on-site environment condition sensor and within which the microprocessor is disposed, said housing accessible through an opening having a door securable in a closed configuration with a non-alarm securement device to thereby prohibit unauthorized microprocessor intrusion.

10. An on-site environment monitoring system as claimed in claim 8 wherein the on-site alarm device is a visible stimulus.

11. An on-site environment monitoring system as claimed in claim 8 wherein the on-site alarm device is an audible stimulus.

12. An on-site environment monitoring system as claimed in claim 8 wherein the on-site alarm device is both a visible stimulus and an audible stimulus.

13. An on-site environment monitoring system as claimed in claim 9 additionally comprising a battery back-up power source for the system.

14. An on-site environment monitoring system as claimed in claim 9 wherein the microprocessor correlatively stores alarm activation with occurrence time and sensed value of a condition causing said alarm activation.

15. An on-site environment monitoring system as claimed in claim 9 additionally comprising an on-site system initiation switch.

16. An on-site environment monitoring system as claimed in claim 9 wherein said securement device is an integrity seal.

* * * * *